(12) United States Patent
Choi (10) Patent No.: US 8,256,724 B2
(45) Date of Patent: Sep. 4, 2012

(54) DISPLAY DEVICE

(75) Inventor: Moon Hong Choi, Gyoungsangbuk-do (KR)

(73) Assignee: LG Electronics Inc., Seoul (KR)

( * ) Notice: Subject to any disclaimer, the term of this patent is extended or adjusted under 35 U.S.C. 154(b) by 345 days.

(21) Appl. No.: 12/501,888

(22) Filed: Jul. 13, 2009

(65) Prior Publication Data
US 2010/0006731 A1    Jan. 14, 2010

(30) Foreign Application Priority Data

Jul. 14, 2008  (KR) .................. 10-2008-0068199

(51) Int. Cl.
*A47F 5/12* (2006.01)
(52) U.S. Cl. .................. 248/133; 248/372.1; 248/923; 16/374
(58) Field of Classification Search .................. 248/133, 248/139, 140, 142, 372.1, 393, 395, 291.1, 248/292.14, 919, 923, 224.8, 222.41, 225.11, 248/474, 473; 16/374, 337, 340; 403/113, 403/116; 361/679.06, 679.07, 679.21, 679.22; 345/169, 905; 349/58, 65
See application file for complete search history.

(56) References Cited

U.S. PATENT DOCUMENTS

| | | | |
|---|---|---|---|
| 5,108,062 A | 4/1992 | Detwiler | |
| 5,765,794 A * | 6/1998 | Chen | 248/292.12 |
| 7,396,233 B2 * | 7/2008 | Lin | 439/31 |
| 7,694,922 B2 * | 4/2010 | Kim | 248/176.1 |
| 7,819,368 B2 * | 10/2010 | Jung et al. | 248/133 |
| 7,937,810 B2 * | 5/2011 | Hu | 16/241 |
| 8,002,223 B2 * | 8/2011 | Sawai et al. | 248/146 |
| 2003/0046793 A1 | 3/2003 | Novin et al. | |
| 2003/0122046 A1 * | 7/2003 | Huong | 248/291.1 |
| 2005/0255896 A1 | 11/2005 | Ting | |
| 2006/0065800 A1 * | 3/2006 | Bremmon | 248/274.1 |
| 2007/0040077 A1 * | 2/2007 | Baek et al. | 248/133 |
| 2007/0152111 A1 * | 7/2007 | Tang et al. | 248/122.1 |
| 2009/0084918 A1 * | 4/2009 | Pfister et al. | 248/292.14 |
| 2011/0062304 A1 * | 3/2011 | Hsieh et al. | 248/372.1 |

FOREIGN PATENT DOCUMENTS

| | | |
|---|---|---|
| EP | 0478375 A2 | 4/1992 |
| EP | 1760386 A1 | 3/2007 |

OTHER PUBLICATIONS

European Search Report dated Feb. 23, 2012, for Application No. EP09009179.4, 8 pages.

* cited by examiner

*Primary Examiner* — A. Joseph Wujciak, III
(74) *Attorney, Agent, or Firm* — Fish & Richardson P.C.

(57) ABSTRACT

A display device includes a support part. The display device also includes a display main body coupled to the support part and tiltable relative to the support part. The display device further includes a first friction member coupled to the support part and configured to generate a first frictional force when the display main body is titled back and forth relative to the support part. In addition, the display device includes a second friction member configured to generate a second frictional force when the display main body is tilted relative to the support part at a predetermined angle or more.

10 Claims, 8 Drawing Sheets

Fig. 8

DISPLAY DEVICE

CROSS-REFERENCE TO RELATED APPLICATIONS

The present application claims the benefit of priority to Korean Patent Application No. 10-2008-0068199, filed on Jul. 14, 2008, which is hereby incorporated by reference as if fully set forth herein.

FIELD

The present disclosure relates to a display device.

BACKGROUND

A display device is configured to display images and includes a main body in which a display module is disposed. The main body may be supported by a stand unit or a wall. The main body may be tiltable when supported by a stand unit. To make the main body tiltable, the stand unit is provided with a structure that is configured to support the weight of a display.

SUMMARY

In one aspect, a display device includes a support part. The display device also includes a display main body coupled to the support part and tiltable relative to the support part. The display device further includes a first friction member coupled to the support part and configured to generate a first frictional force when the display main body is titled relative to the support part. In addition, the display device includes a second friction member configure to generate a second frictional force when the display main body is tilted relative to the support part at a predetermined angle.

Implementations may include one or more of the following features. For example, the first friction member defines a tilting center of the display main body. Also, the first friction member is placed on the display main body.

In some implementation, the display device further include a cover member that covers the first friction member when the first friction member is positioned on the display main body. The display main body is rotating back and forth.

In some examples, the second friction member and the first friction member are one piece. The display device further include a stopper that sets a tilting limitation of the display main body in the first direction. The stopper is connected to the second friction member. Also, the stopper is connected to the first friction member, and the display main body is provided with a guide hole.

The stopper is positioned within the guide hole and guided by the guide hole. And, the guide hole is selectively in contact with the second friction member.

In some implementations, the guide hole is greater than the stopper in longitudinal length at a middle part of the guide hole, and the guide hole decreases in lateral width forward and rearward from the middle part of the guide hole. Also, the guide hole is asymmetrical such that a maximum forward tilted angle and a maximum rearward tilted angle of the display main body are different from each other.

In some examples, in a state where the second frictional force is generated by tilting the display main body in the first direction, when a tilted angle of the display main body is increased in the first direction in which the display main body is tilted, the second frictional force is increased. The second friction member is selectively in contact with at least one portion of one of the display main body and the first friction member, and is elastically deformed based on contact with the one of the display main body and the first friction member. And, a center of the second friction member is provided with an elastic hole that facilitates elastic deformation the second friction member.

In another aspect, a display device include a display main body configured to tilt back and forth. The display device also include a stand body configured to support the display main body. The display device further include a cover member that connects the stand body to the display main body. The stand body includes a first friction member that is configured to contact the display main body to generate a first frictional force when the display main body is tilted back and forth relative to the stand body and a second friction member that is inserted into a guide hole defined in the display main body, and that is, when the display main body is tilted back and forth relative to the stand body, selectively in contact with an inner surface of the guide hole to generate a second frictional force.

Implementations may include one or more features. For example, the first friction member is cylindrical and a portion of the display main body in contact with the first friction member further include a seat part that has a corresponding shape to an outer surface of the first friction member.

The first friction member is continuously contact with one side of the display main body when tilting the display main body is tilted.

The second friction member contacts the inner surface of the guide hole when the display main body in first direction, as the display main body is tilted further in the direction, the second frictional force is increased. Also, the second friction member is disposed on an upper side of the first friction member. The second friction member fails to contact the inner surface of the guide hole when the main body is tilted less than a particular angle relative to the stand body and the second friction member contacts the inner surface of the guide hole when the main body is tilted more than the particular angle relative to the stand body to generate the second frictional force.

As yet another aspect, a display device include a stand body includes a support part. The display device also include a display main body coupled to the stand body tiltable back and forth relative to a stand body or the support part. The display device further include a friction producer coupled to the display main body configured to produce at least two frictional forces when the display main body is titled relative to the stand body or the support part in the first direction.

Implementations may include one or more features. For example, the friction producing means produces the first friction force and the second friction force when the display main body is tilted back and forth within a predetermined angle relative to the stand body or the supporting part.

DETAILED DESCRIPTION

Figure 1:
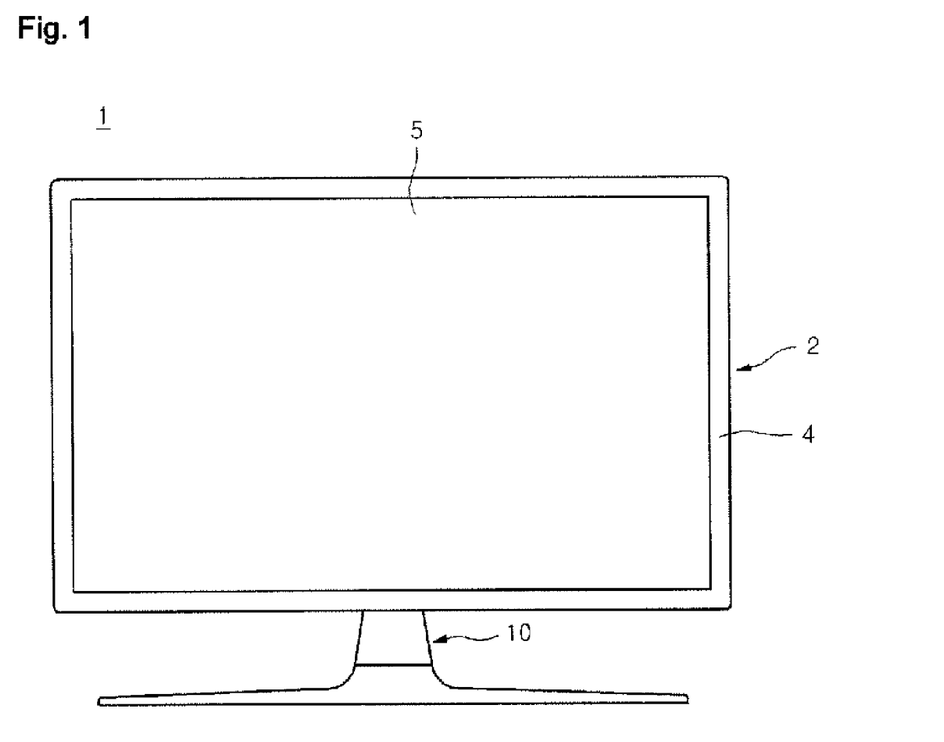
FIG. 1 is a schematic view illustrating a display device.

FIG. 1 illustrates an example of a display device 1. As shown, the display device 1 includes a display main body 2 displaying an image, and a stand unit 10 that is coupled to the lower side of the display main body 2 to support the display main body 2.

Figure 3:
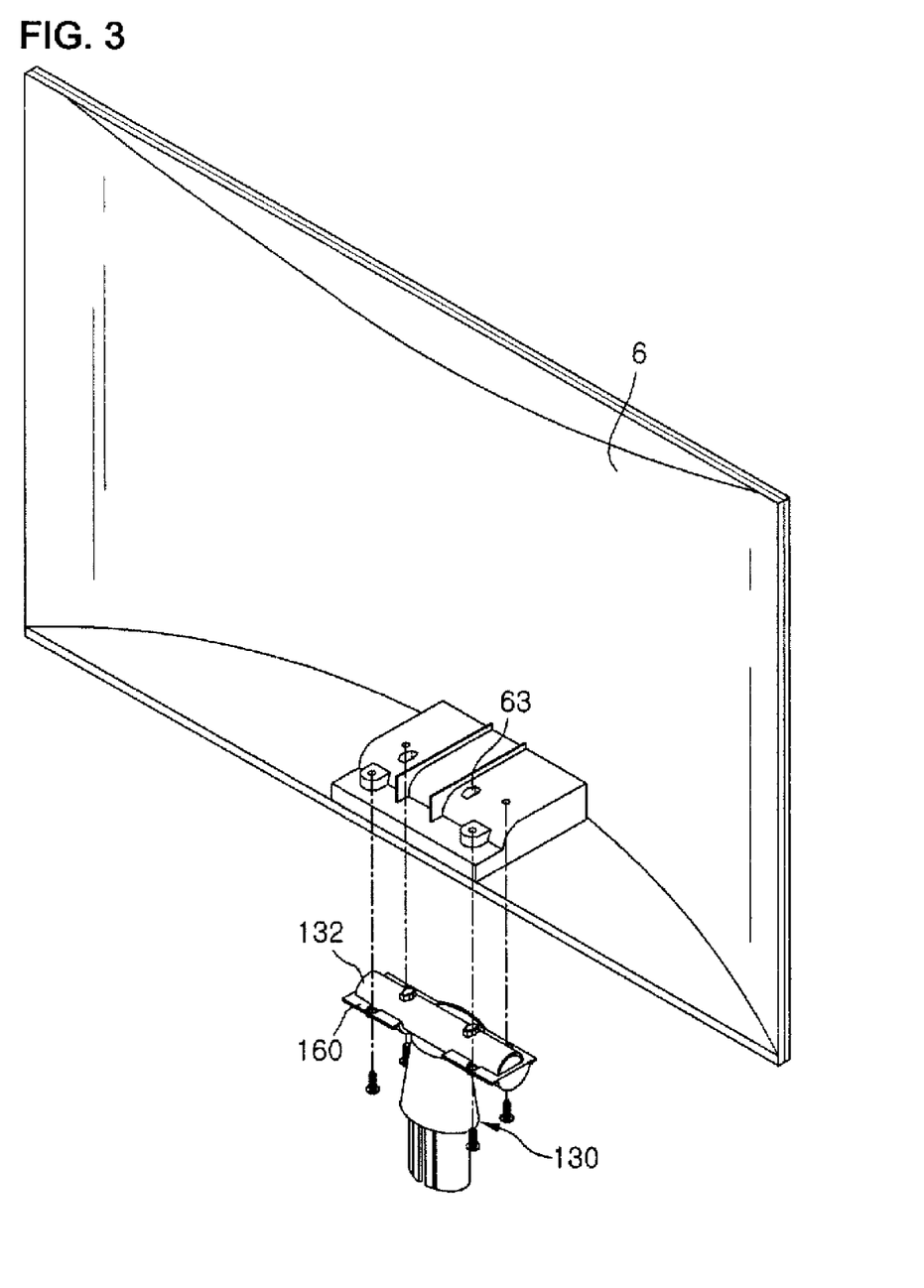
FIG. 3 is a perspective view illustrating a rear cabinet to be coupled to the stand unit of FIG. 1.

The display main body 2 includes a front cabinet 4 providing a front appearance, and a rear cabinet 6 shown in FIG. 3 coupled to the back of the front cabinet 4 to provide a rear appearance. A display module 5 is disposed between the front cabinet 4 and the rear cabinet 6.

The display main body 2, supported by the stand unit 10, is rotatable (tiltable) back and forth. A frictional force between the display main body 2 and the stand unit 10 maintains a tilted position of the display main body 2.

Figure 2:
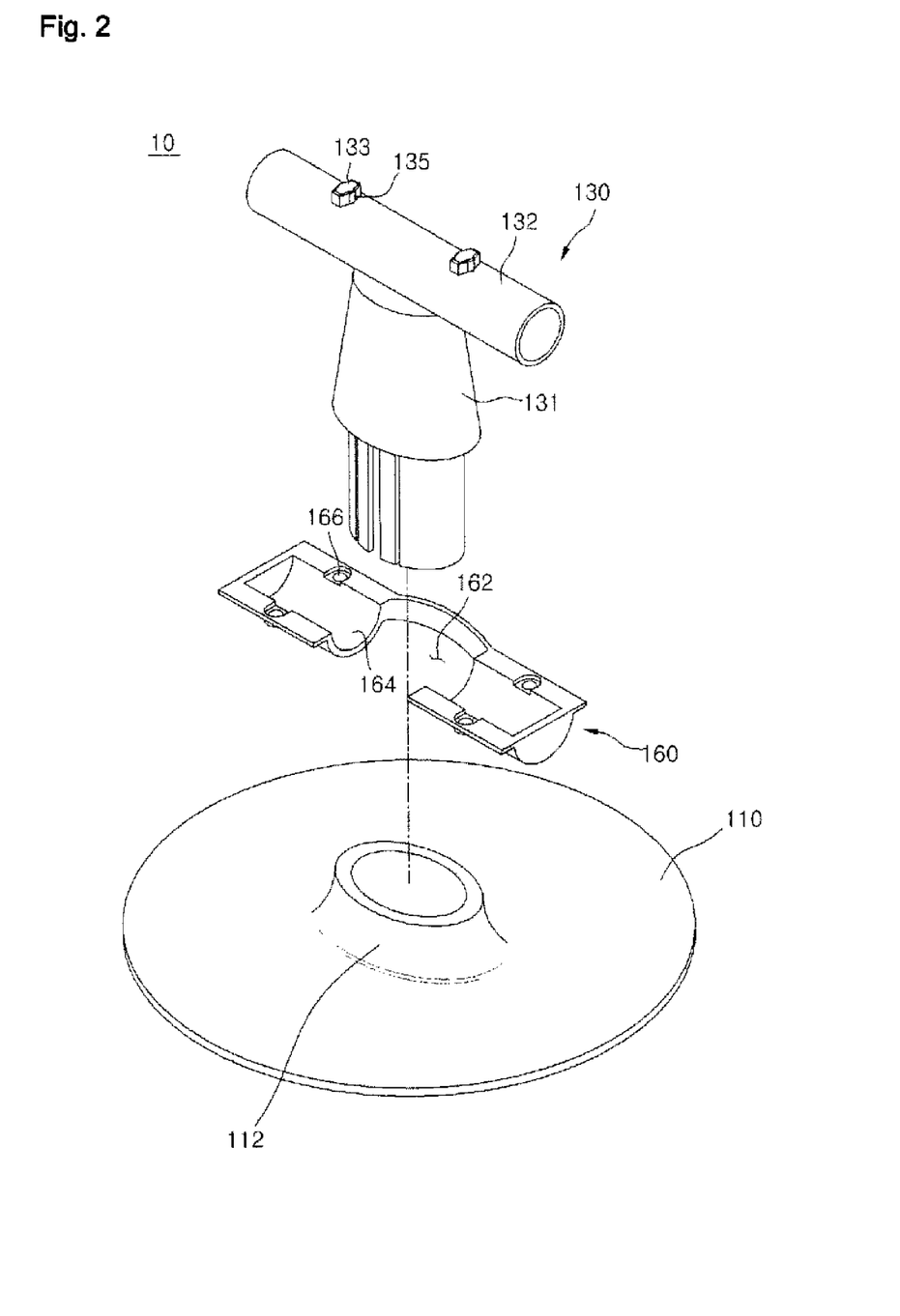
FIG. 2 is an exploded perspective view illustrating a stand unit of FIG. 1.

FIG. 2 illustrates an example of the stand unit 10. Referring to FIG. 2, the stand unit 10 includes a base 110 disposed on a predetermined surface, a stand body 130 coupled to the base 110 to experience friction with the display main body 2 when tilting the display main body 2, and a cover member 160 coupled to the display main body 2 to support the stand body 130.

A neck part 112 is disposed in the center of the base 110 to couple with the stand body 130.

The stand body 130 includes a support part 131 coupled to the neck part 112, and a first friction member 132 formed in one piece with the upper side of the support part 131 to experience friction with the display main body 2 when the display main body 2 tilts or rotates.

The first friction member 132 is cylindrical and laterally elongated on the upper side of the support part 131. That is, the first friction member 132 extends horizontally.

The first friction member 132 is placed on the lower side of the display main body 2 to produce friction between the display main body 2 and the outer surface of the first friction member 132 when the display main body 2 tilts or rotates.

In this case, the first friction member 132 functions as the rotation center of the display main body 2 and is cylindrical to rotate the display main body 2 about the first friction member 132.

A plurality of stoppers 133 protrude from the upper side of the first friction member 132 to limit a tilting range of the display main body 2. Alternatively, a single stopper may be provided. The stoppers 133 are spaced apart from each other with respect to the center of the first friction member 132, and limit rotation of the display main body 2. The stoppers 133 are inserted into the display main body 2.

Second friction members 135 are disposed on the lateral sides of each of the stoppers 133. The second friction members 135 are selectively in contact with guide holes 63 shown in FIG. 3 according to a rotation angle of the first friction member 132 relative to the display main body 2, so as to produce a second frictional force.

Although the first friction member 132 and the support part 131 are formed in one piece in the present example, the first friction member 132 and the support part 131 may be discrete pieces to be coupled.

As the display main body 2 is tilted back and forth, the center of gravity of the display main body 2 shifts, thereby varying the rotational moment of the display main body 2 about the first friction member 132 that functions as the rotation center of the display main body 2. That is, when the display main body 2 is disposed vertically from the stand unit 10, its rotation moment is minimum. As the display main body 2 is tilted backward or forward, its rotation moment is increased.

Thus, when the display main body 2 is tilted until a predetermined tilted angle, the first frictional force produced between the first friction member 132 and the display main body 2 maintains a tilted position of the display main body 2.

When the display main body 2 is tilted over the predetermined tilted angle of the display main body 2, the second friction members 135 come in contact with the lower side of the display main body 2 to produce the second frictional force that compensates for the rotational moment increased by the tilting of the display main body 2.

When the first friction member 132 is placed on the display main body 2, the cover member 160 is coupled to the display main body 2 to cover and to support the first friction member 132.

The middle of the cover member 160 is provided with an opening 162 through which the stand body 130 passes. The cover member 160 is provided with a seat part 164 on which the first friction member 132 is placed. The seat part 164 has a recessed shape corresponding to the first friction member 132.

The cover member 160 is provided with a plurality of coupling holes 166 that are coupled with a coupling member for coupling the cover member 160 to the display main body 2.

Since the first friction member 132 is directly in contact with the display main body 2, the first frictional force between the display main body 2 and the first friction member 132 is adjusted according to a coupling force between the cover member 160 and the display main body 2.

That is, when the coupling force between the cover member 160 and the display main body 2 is increased, the first frictional force between the display main body 2 and the first friction member 132 is increased.

Thus, when the size of the display main body 2 is increased, the coupling force between the cover member 160 and the display main body 2 may be increased to increase the first frictional force between the first friction member 132 and the display main body 2.

Figure 4:
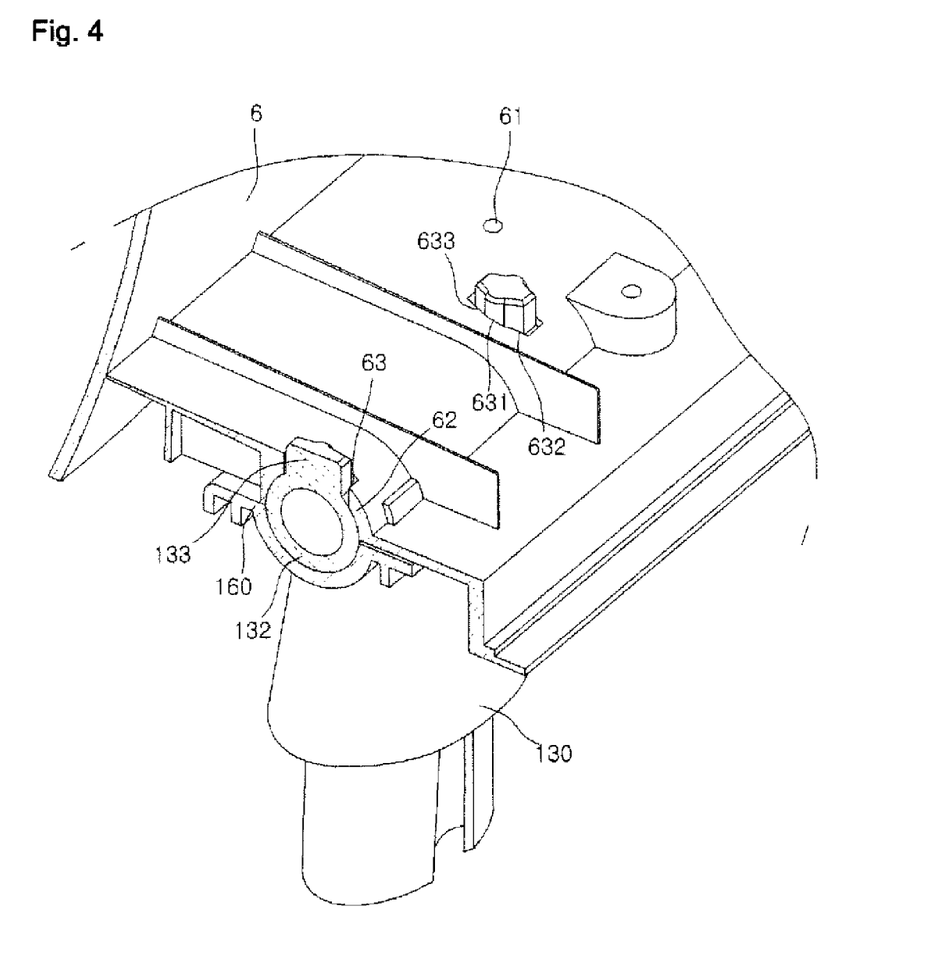
FIG. 4 is a partial cut-away perspective view illustrating the rear cabinet coupled to the stand unit of FIG. 1.
Figure 5:
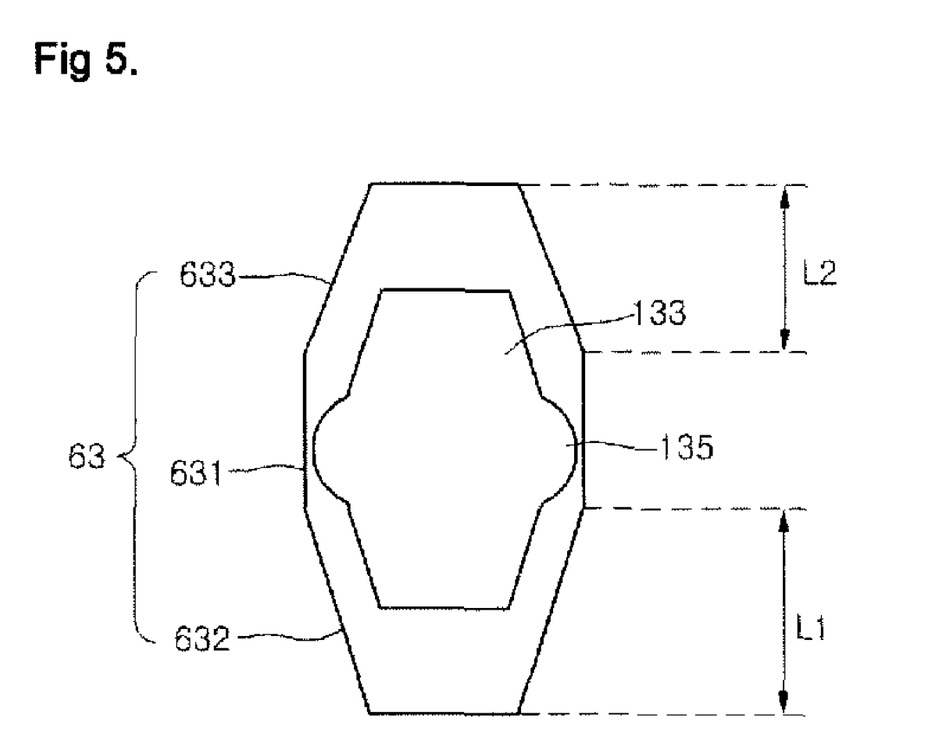
FIG. 5 is a schematic view illustrating a relative position between a stopper and a guide hole when a display main body of FIG. 1 is not tilted.

Referring to FIGS. 3 to 5, the stand unit 10 is coupled to the lower surface of the rear cabinet 6. The rear cabinet 6 is provided with a seat part 62 on which the first friction member 132 is placed. The seat part 62 is recessed upward from the lower surface of the rear cabinet 6.

The rear cabinet 6 is provided with the guide holes 63 into which the stoppers 133 are inserted. The guide holes 63 are elongated in the back-and-forth direction of the rear cabinet 6, and are greater than the lengths of the stoppers 133. Thus, the size difference between the stopper 133 and the guide hole 63 allows tilting of the display main body 2. When the display main body 2 is tilted through a predetermined angle, the display main body 2 is stopped by the stoppers 133.

The guide hole 63 includes a middle part 631, a front part 632 extending from the middle part 631, and a rear part 633. The lateral width of the guide hole 63 in the middle part 631 is greater than the lateral width of the stopper 133 provided with the second friction members 135. The lateral widths of the guide hole 63 in the ends of the front part 632 and the rear part 633 are smaller than the lateral width of the stopper 133 provided with the second friction members 135. That is, the front part 632 and the rear part 633 decrease in lateral width in directions distant from the middle part 631.

Thus, when the display main body 2 is not tilted, the second friction members 135 are disposed in the middle part 631 of the guide hole 63, so that the second friction members 135 are spaced apart from the lateral surfaces of the guide holes 63. When the display main body 2 is tilted backward or forward, the stopper 133 is disposed in the front part 632 or the rear part 633 of the guide hole 63. Furthermore, when the display main body 2 is tilted over a predetermined angle, the stopper 133 is in contact with the inner surface of the guide hole 63.

The front part 632 is longer than the rear part 633 in the back-and-forth direction of the guide hole 63. Thus, a length L1 of the front part 632 may be greater than a length L2 of the rear part 633, that is, the guide hole 63 may be asymmetrical. Accordingly, a forward tilted angle of the display main body 2 is greater than its rearward tilted angle.

That is, the maximum rear tilted angle of the display main body 2 may be greater than its maximum forward tilted angle.

Alternatively, the front part 632 and the rear part 633 may have the same length, and the length of the front part 632 or the rear part 633 may be adjusted to modify the maximum tilted angle of the display main body 2.

The lateral widths of the front part 632 and the rear part 633 of the guide hole 63 are adjusted to modify the contact areas between the second friction members 135 and the front and rear parts 632 and 633 and thus controlling the second frictional force due to the tilting of the display main body 2.

The rear cabinet 6 is provided with a plurality of coupling holes 61 for coupling with the coupling member that is coupled to the cover member 160.

Hereinafter, a process of coupling the stand unit 10 to the display main body 2 is described.

First, the stoppers 133 of the first friction member 132 are aligned with the guide holes 63 of the rear cabinet 6, and the first friction member 132 is then placed on the seat part 62 of the rear cabinet 6, so that the stoppers 133 are inserted into the guide holes 63.

In the state where the first friction member 132 is placed on the rear cabinet 6, the coupling holes 166 of the cover member 160 are aligned with the coupling holes 61 of the rear cabinet 6. After that, the first friction member 132 is covered with the cover member 160, and the coupling members are then coupled to the coupling holes 166 and 61 to complete the coupling of the stand unit 10 and the display main body 2.

As described above, the cover member 160 is coupled to the rear cabinet 6 in the state where the first friction member 132 is placed on the rear cabinet 6. Alternately, the cover member 160 may be coupled to the rear cabinet 6 in the state where the first friction member 132 is placed on the cover member 160.

After finishing the process of coupling the stand unit 10 to the display main body 2, the first frictional force generated between the first friction member 132, the seat part 62 of the display main body 2, and the cover member 160 maintains the tilting of the display main body 2.

Hereinafter, relative positions between the stoppers 133 and the guide holes 63 when the display main body 2 tilts is described in detail.

Referring to FIG. 5, when the display main body 2 is not tilted, that is, when the display main body 2 is disposed vertically from the base 110, the second friction members 135 provided to the stopper 133 are disposed in the middle part 631 of the guide hole 63. Since the lateral width of the middle part 631 is greater than that of the stopper 133 provided with the second friction members 135, the second friction members 135 are spaced apart from the lower surface of the display main body 2 provided with the guide holes 63. Thus, when the display main body 2 is not tilted, only the first frictional force between the first friction member 132 and the seat part 62 of the display main body 2 is exerted to the display main body 2.

Figure 6A:
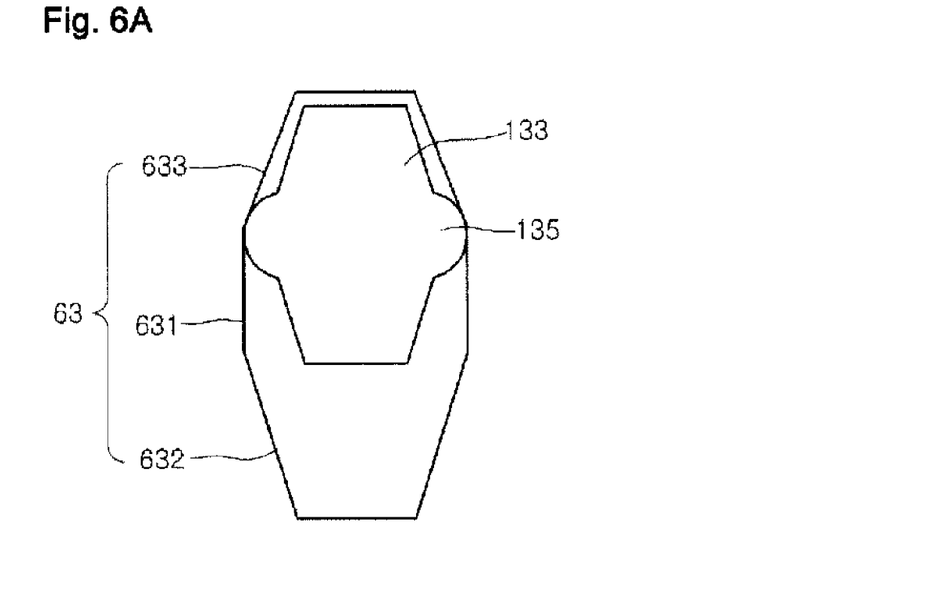
FIGS. 6A and 6B are schematic views illustrating relative positions between the stopper and the guide hole when the display main body of FIG. 1 is tilted forward.
Figure 6B:
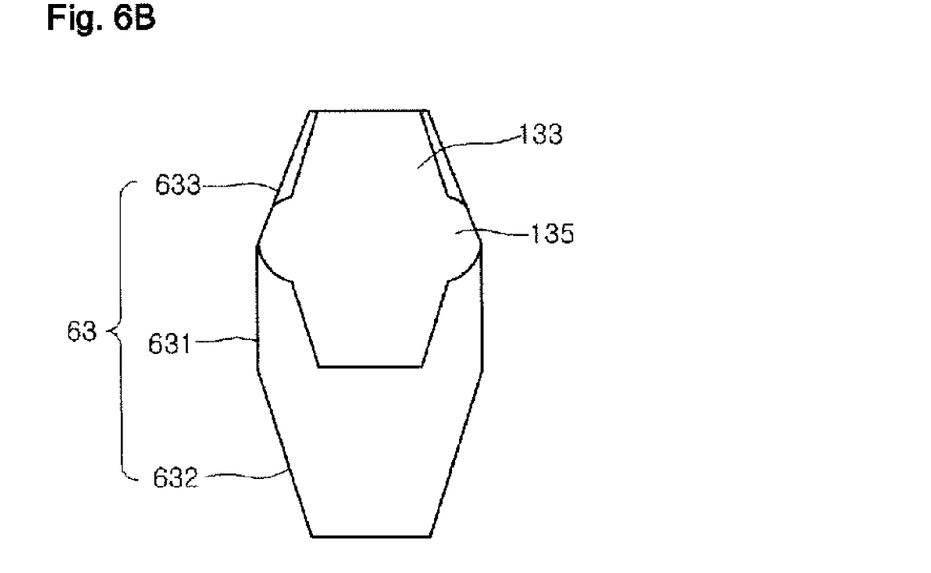

Referring to FIGS. 6A and 6B, when the display main body 2 is tilted forward, the stopper 133 relatively moves rearward in the guide holes 63. That is, the stopper 133 relatively moves from the middle part 631 of the guide hole 63 to the rear part 633. The lateral width of the rear part 633 in a portion connected to the middle part 631 is the same as that of the middle part 631, but the lateral width of the rear part 633 gradually decreases in the direction that is distant from the portion connected to the middle part 631, so that the lateral width in the end of the rear part 633 is smaller than that of the middle part 631 provided with the second friction members 135. Thus, when the display main body 2 is tilted forward over a predetermined angle, the second friction members 135 are in contact with both sides of the rear part 633 to produce the second frictional force.

As the second friction members 135 move from the two contact sides of the rear part 633 to a position of the rear part 633 where a side of the stopper 133 is in contact with the end of the rear part 633, the second frictional force between the second friction members 135 and the rear part 633 is gradually increased.

The lateral width of the rear part 633 decreases toward the end of the rear part 633. Thus, as the second friction members 135 move to the end of the rear part 633, that is, as the forward tilting angle of the display main body 2 is increased, the second frictional force is increased.

When the side of the stopper 133 is in contact with the end of the rear part 633, the stopper 133 is stopped and thus prevents the display main body 2 from being further tilted forward.

As described above, the forward tilted angle of the display main body 2 is limited according to the length L2 of the rear part 633.

Figure 7A:
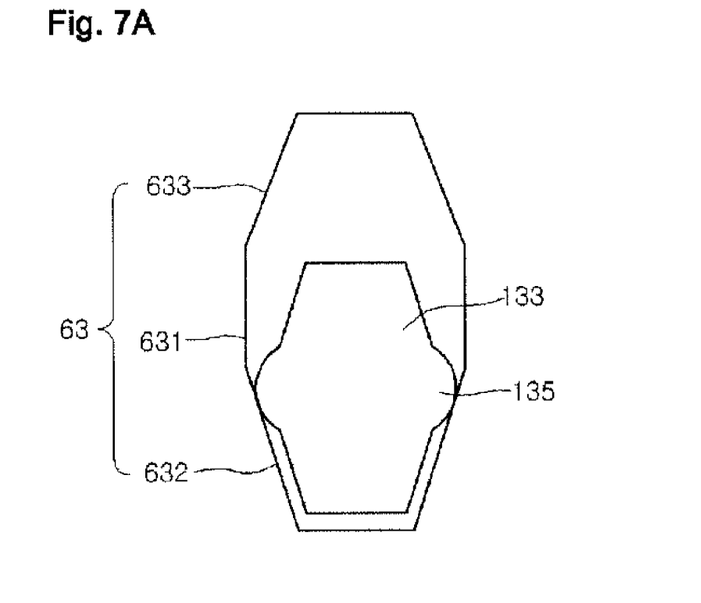
FIGS. 7A and 7B are schematic views illustrating relative positions between the stopper and the guide hole when the display main body of FIG. 1 is tilted rearward.
Figure 7B:
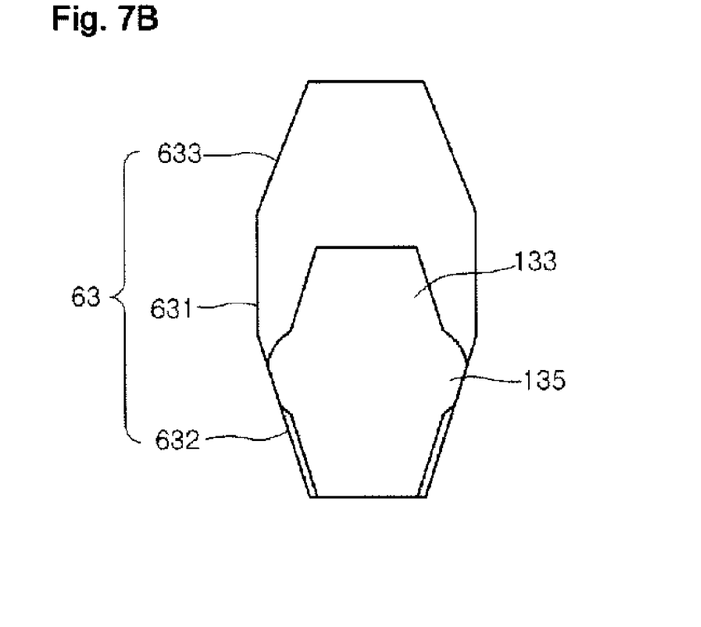

Referring to FIGS. 7A and 7B, the front part 632 of the guide hole 63 has a similar shape to the rear part 633.

When the display main body 2 is tilted rearward, the second friction members 135 of the stopper 133 are in contact with both sides of the front part 632 to produce the second frictional force.

In this state, as the second friction members 135 move the end of the front part 632, the second frictional force of the second friction members 135 is increased, which is the same as that of the rear part 633.

When the stopper 133 is in contact with the end of the front part 632, the stopper 133 is stopped and thus prevents the display main body 2 from being further tilted rearward, which is also the same as that of the rear part 633.

Referring again to FIG. 6A to 7B, when the second friction members 135 are in contact with the sides of the front part 632 or the rear part 633, and when the display main body 2 is tilted forward or backward, the second friction members 135 move to the end of the front part 632 or the rear part 633.

As the second friction members 135 move, the lateral width of the front part 632 or the rear part 633 in contact with the second friction members 135 is decreased, and the contact area between the second friction members 135 and the front part 632 or the rear part 633 is increased to increase the second frictional force caused by the second friction members 135.

At least one of the second friction members 135 and the guide hole 63 including the front part 632 and the rear part 633 may be elastically deformed by the contact there-between.

When the stopper 133 comes in contact with the end of the front part 632 or the rear part 633 while the second friction members 135 and the stopper 133 move, the display main body 2 is not tilted forward or rearward any more.

When the display main body 2 is tilted, the frictional force is produced between the first friction member 132 and the display main body 2, and the additional frictional force is generated to compensate for variation in the rotational moment of the display main body 2 according to the tilted state of the display main body 2. Thus, a frictional force corresponding to the tilted state of the display main body 2 is obtained without an additional member.

Furthermore, the ranges of the forward and backward tilted angles of the display main body 2, and the frictional force caused by the second friction members 135 can be controlled by modifying the longitudinal length or lateral width of the front part 632 and the rear part 633 of the guide hole 63.

As described above, the first friction member is provided with the stoppers, and the display main body is provided with the guide holes. Alternatively, the display main body may be provided with the stoppers, and the first friction member may be provided with the guide holes through which the stoppers are inserted.

Figure 8:
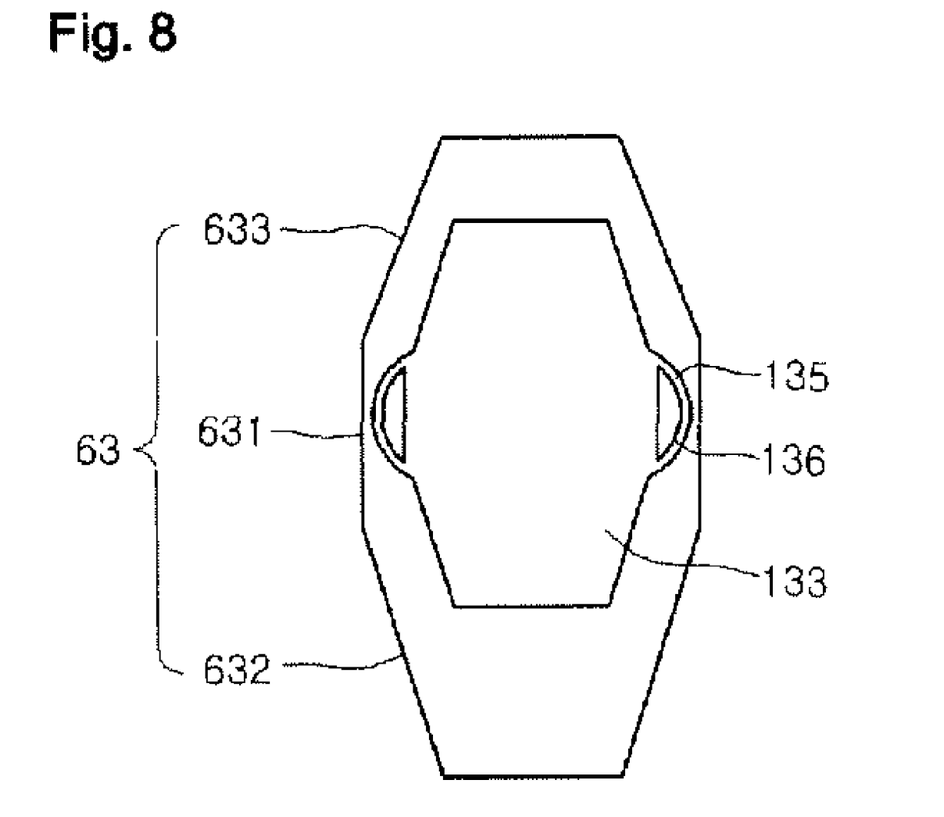
FIG. 8 is a schematic view illustrating the stopper and guide hole in a state where the display main body of FIG. 1 is not tilted.

FIG. 8 illustrates an example stopper and guide hole. Referring to FIG. 8, elastic holes 136 pass through the centers of the second friction members 135.

The elastic holes 136 pass through the centers of the second friction members 135 in a perpendicular direction to the direction in which the second friction members 135 move along the inner surface of the guide hole 63. Thus, when the outer surfaces of the second friction members 135 are in contact with the inner surface of the guide hole 63 to generate the second frictional force, the elastic holes 136 facilitate to elastically deform the second friction members 135.

That is, when the display main body 2 is tilted forward or backward, the second friction members 135 are in contact with the inner surface of the front part 632 or the rear part 633 to generate the second frictional force. At this point, the outer surfaces of the second friction members 135 in contact with the inner surface of the front part 632 or the rear part 633 are elastically collapsed toward the elastic holes 136. When the outer surfaces of the second friction members 135 are released from the inner surface of the front part 632 or the rear part 633, the outer surfaces of the second friction members 135 are restored to their original states.

According to the implementation shown in FIG. 8, the second friction members 135 and the stopper 133 are formed in one piece. Alternatively, the second friction member 135 may be a discrete elastic member, such as a leaf spring, an elastic force of which is increased according to its contact area.

According to some implementations, the elastic deformation of the second friction members 135 is facilitated to efficiently generate the second frictional force, and to efficiently control the strength of the second frictional force.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A display device comprising:
   a support part;
   a display main body coupled to the support part and tiltable relative to the support part;
   a first friction member coupled to the support part and configured to generate a first frictional force when the display main body is titled relative to the support part in a first direction; and
   a second friction member configured to generate a second frictional force when the display main body is tilted relative to the support part in the first direction by at least a predetermined angle;
   a stopper that sets a tilting limitation of the display main body in the first direction, the stopper connected to the second friction member; and
   a guide hole formed in the display main body,
   wherein the stopper is positioned within the guide hole and guided by the guide hole, and the guide hole is selectively in contact with the second friction member, and
   wherein the guide hole is greater than the stopper in longitudinal length at a middle part of the guide hole, and the guide hole decreases in lateral width forward and rearward from the middle part of the guide hole.

2. The display device according to claim 1, wherein the first friction member defines a tilting center of the display main body.

3. The display device according to claim 1, wherein the first friction member is positioned on the display main body.

4. The display device according to claim 3, further comprising a cover member that covers the first friction member when the first friction member is positioned on the display main body.

5. The display device according to claim 1, wherein the display main body is rotatable relative to the support part.

6. The display device according to claim 1, wherein the second friction member and the first friction member are one piece.

7. The display device according to claim 1, wherein the guide hole is asymmetrical such that a maximum forward tilted angle and a maximum rearward tilted angle of the display main body are different from each other.

8. The display device according to claim 1, wherein, in a state where the second frictional force is generated by tilting the display main body in the first direction, when a tilted angle of the display main body is increased in the first direction in which the display main body is tilted, the second frictional force is increased.

9. The display device according to claim 1, wherein the second friction member is selectively in contact with at least one portion of one of the display main body and the first friction member, and is elastically deformed based on contact with the one of the display main body and the first friction member.

10. The display device according to claim 9, wherein a center of the second friction member is provided with an elastic hole that facilitates elastic deformation the second friction member.

* * * * *